United States Patent [19]
Holley et al.

[11] Patent Number: 5,228,319
[45] Date of Patent: Jul. 20, 1993

[54] DESKTOP COMPUTER LOCKING ASSEMBLY

[75] Inventors: Raymond J. Holley, Austin; Robert D. Weiss, Georgetown; Robert H. Garrett; Karl M. Steffes, both of Austin, all of Tex.

[73] Assignee: Dell USA, L.P., Austin, Tex.

[21] Appl. No.: 765,355

[22] Filed: Sep. 25, 1991

[51] Int. Cl.⁵ .................... E05B 73/00; H01R 13/44
[52] U.S. Cl. ......................................... 70/58; 248/552; 361/380; 439/135
[58] Field of Search ............................ 70/2, 3, 6, 18, 30, 70/49, 57, 58; 292/281, DIG. 53, DIG. 64; 248/551, 552, 553, 917; 439/135, 501, 304; 361/380; 364/708

[56] References Cited

U.S. PATENT DOCUMENTS

| | | | |
|---|---|---|---|
| 3,984,075 | 10/1976 | Bahner et al. | 70/58 X |
| 4,212,175 | 7/1980 | Zakow | 70/58 |
| 4,418,550 | 12/1983 | Hamilton | 70/18 |
| 4,570,465 | 2/1986 | Bennett | 70/58 X |
| 4,585,202 | 4/1986 | Parsekian | 70/58 X |
| 4,680,949 | 7/1987 | Stewart | 70/58 X |
| 5,076,619 | 12/1991 | Chi | 439/135 X |

FOREIGN PATENT DOCUMENTS 2158662 11/1985 United Kingdom ............... 439/304

Primary Examiner—Lloyd A. Gall
Attorney, Agent, or Firm—Thomas G. Devine; James W. Huffman

[57] ABSTRACT

A digital computer system has a lock hold-down assembly for security. The assembly is secured at a standard expansion card slot in the computer unit, and includes a bracket mounted inside the unit, accessible through the slot. In the preferred embodiment, the bracket has an integral flange with an aperture therethrough and a plurality of tabs. A cover member has a plurality of hooks for engaging the plurality of tabs through the slot. The cover member also has a cable enclosure through which the power cable and peripheral cables may be run. The cover member further has an integral flange with an aperture therethrough. A lock is placed through both apertures, thereby securing the unit and cables to the lock. The lock is anchored as desired.

5 Claims, 4 Drawing Sheets

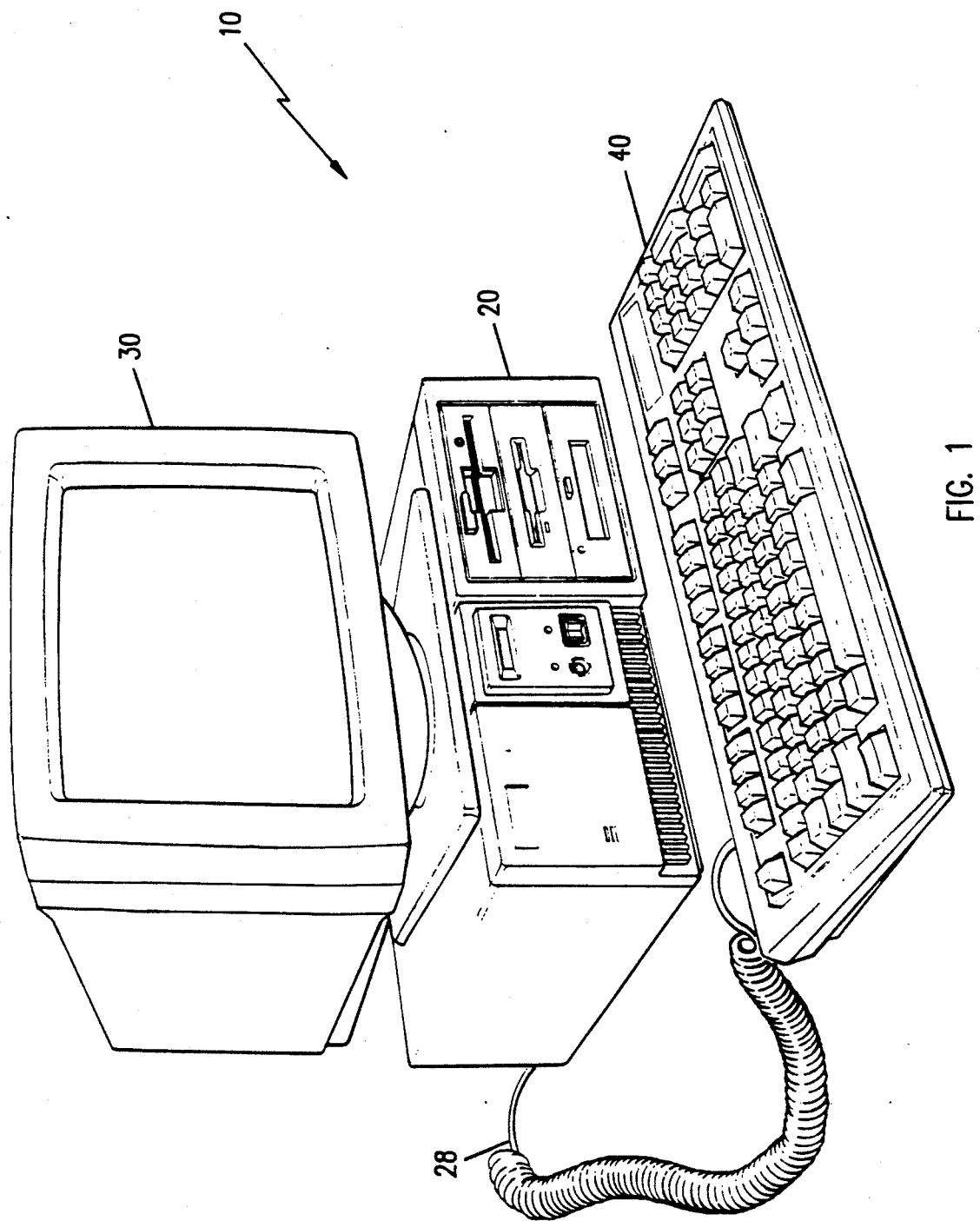

DESKTOP COMPUTER LOCKING ASSEMBLY

BACKGROUND OF THE INVENTION

1. Field of the Invention

This invention relates to hold down locking assemblies for desktop computers. More particularly, it pertains to lock down assemblies that are secured through an expansion card slot.

2. Description of the Related Art

In the past, some personal computer security devices have required the use to modify the computer enclosure. Such modification includes adding additional holes and/or screws to the enclosure to attach the security device. This method permanently alters the computer enclosure and is difficult and inconvenient for the computer owner to install.

Another prior art method involves connecting security devices to the computer enclosure using adhesives. This method is relatively simple to install but may result in some damage to the enclosure should the device ever be removed. Also, the security offered by a device that is held in place by adhesives may be less than desired.

Other prior art devices are designed for specific manufacturer's computers. This type of device utilizes screws, holes or other features that are specific to a particular manufacturer's computer as attachment features for the security device. These devices are limited in usefulness because they can provide a security solution for specific machine types only.

This invention overcomes the problems associated with the above-described prior art solutions.

BRIEF SUMMARY OF THE INVENTION

In a first aspect of the invention, a bracket is attached to the frame of the computer unit of a computer system. It is positioned inside the unit housing, adjacent an expansion card slot. An expansion card slot in a desktop computer, such as a personal computer, is used to enable adding functions to the computer such as memory and other logic. A clamp engages the bracket and an anchor cable. The anchor cable is brought out through the slot to an appropriate anchor. Using this first aspect of the invention, the unit housing requires a lock to prevent its removal and the subsequent removal of the clamp.

The preferred embodiment of this invention includes a bracket attached to the frame of the computer unit, inside the unit and adjacent an expansion slot. The bracket has an integral flange that projects through the slot, the flange having an aperture therethrough. The aperture is positioned to enable a lock to be inserted through the aperture, thereby securing the system unit to the lock.

In the preferred embodiment of this invention, a cover member is mounted on the outside of the chassis, adjacent the expansion slot. It has a cable enclosure, integral with the cover member, formed and positioned to secure the cable to the cover member when the cover member is in position against the chassis. The bracket has a plurality of tabs and the cover member has a plurality of hooks. The cover member and the bracket are secured by engaging the hooks with the tabs. The cover member also has an integral flange having an aperture therethrough. The apertures in the first and second flanges are aligned so that a lock may be inserted through both apertures. Cables from peripheral devices such as a keyboard, monitor, mouse, etc. and power cables, may be inserted through the cable enclosure. With the lock in position through the two apertures, the computer unit and selected peripheral devices are effectively secured to the lock. Typically, the lock has an anchor cable attached, with the anchor cable secured as desired.

BRIEF DESCRIPTION OF THE DRAWINGS

FIG. 1 is a perspective view of the computer system of this invention.

DETAILED DESCRIPTION OF THE INVENTION

Figure 2C:
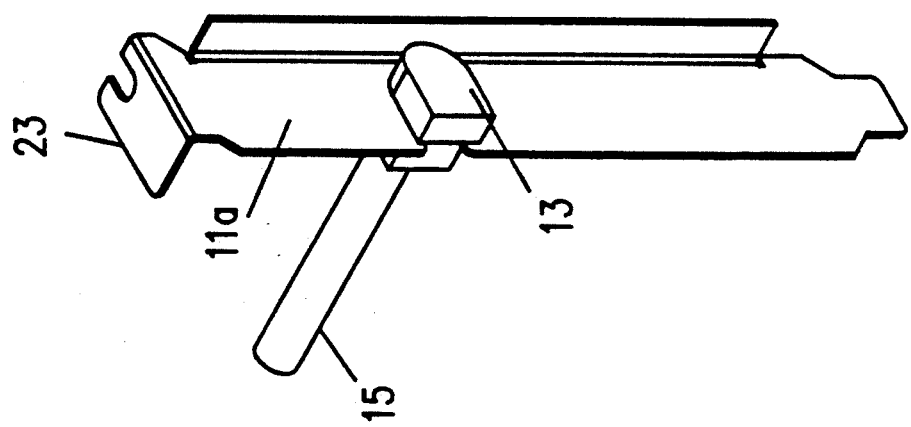
FIGS. 2A, 2B, and 2C are perspective views of one embodiment of this invention.

This invention provides a security system for desktop computers having expansion slots. It does not require any special fixtures to be attached nor any holes to be drilled. In the preferred embodiment, it also effectively provides security for the peripheral devices attached to the computer unit. Following is a detailed description of the invention.

FIG. 1 illustrates a computer system 10 having a computer unit 20, a monitor 30 and a keyboard 40 attached to the computer unit through cable 28.

Figure 2B:
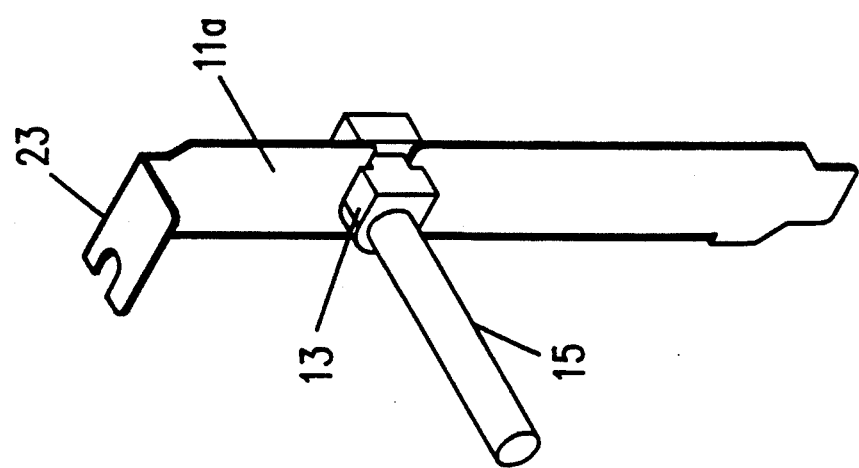
Figure 2A:
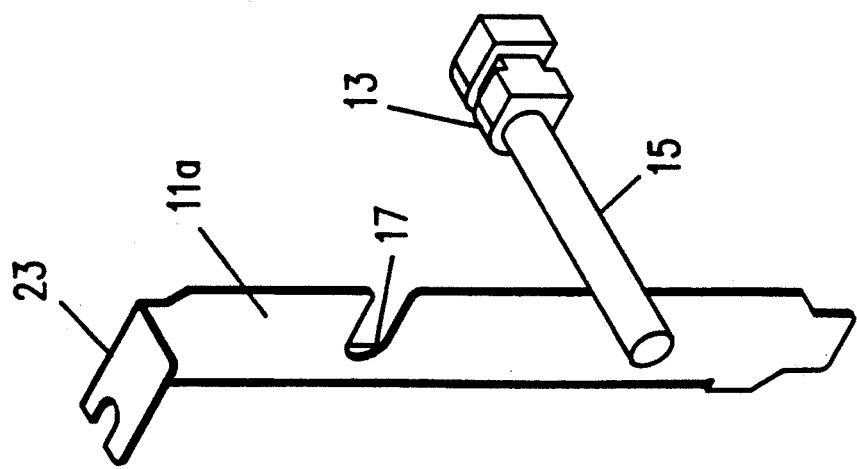

FIG. 2A illustrates one embodiment of this invention showing bracket member 11a having fastener tab 23, and slot 17. Clamp 13 fits into slot 17, securing anchor cable 15 to bracket member 11a.

FIG. 2B illustrates clamp 13 in place in slot 17 of bracket member 11a.

FIG. 2C also illustrates bracket 13 in place in slot 17 of bracket 11a.

Figure 3:
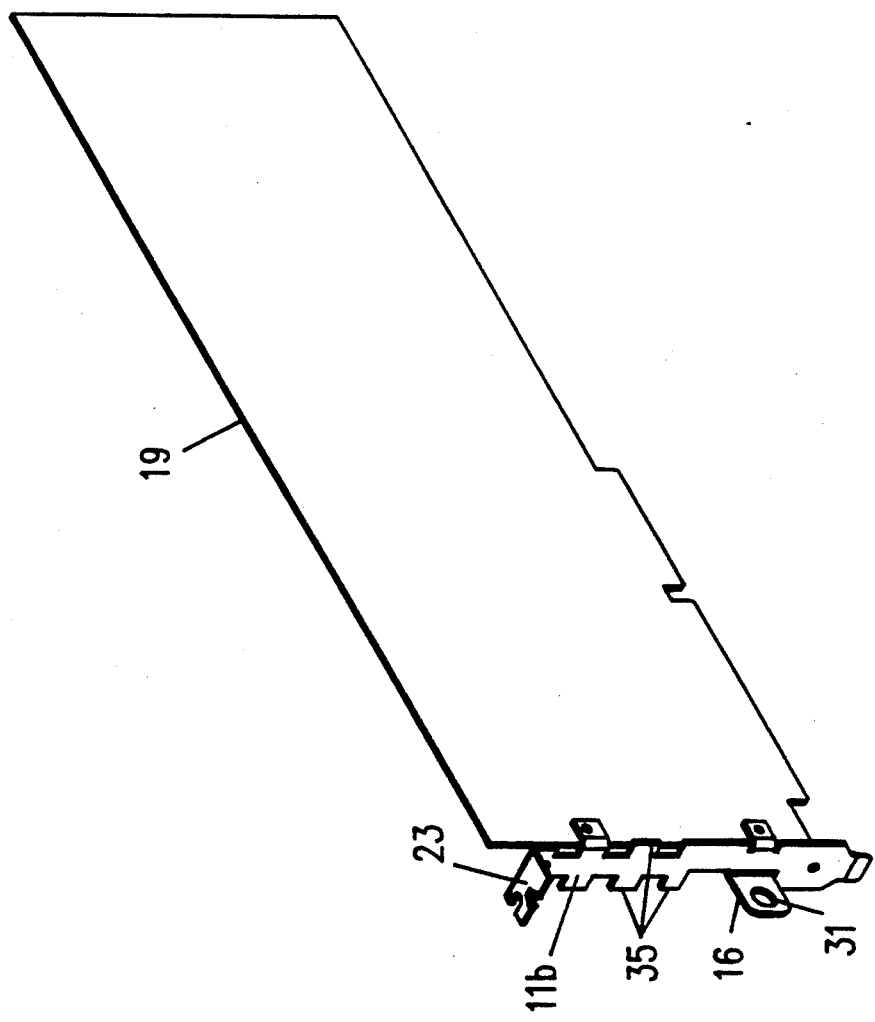
FIG. 3 illustrates the bracket of this invention with an expansion card in place.

FIG. 3 illustrates another embodiment of bracket member 11b having attachment tab 23. Integral flange 16 has aperture 31 therethrough. Expansion card 19 is shown attached to bracket 11b. If no expansion card is used in the expansion slot, then bracket member 11c of FIG. 4 may be used.

Figure 4:
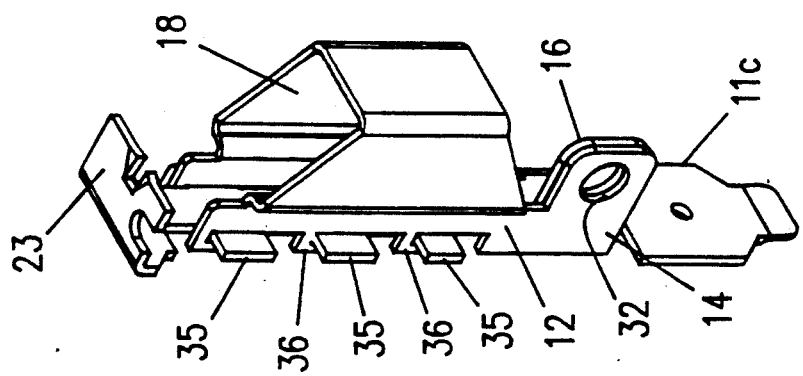
FIG. 4 illustrates the bracket and cover member of this invention, interlocked.

FIG. 4 illustrates bracket 11c having tabs 35. Cover member 12 has hooks 36 engaging tabs 35 as shown, with integral flange 14 having aperture 32. Also, integral cable enclosure 18 is shown.

Figure 5:
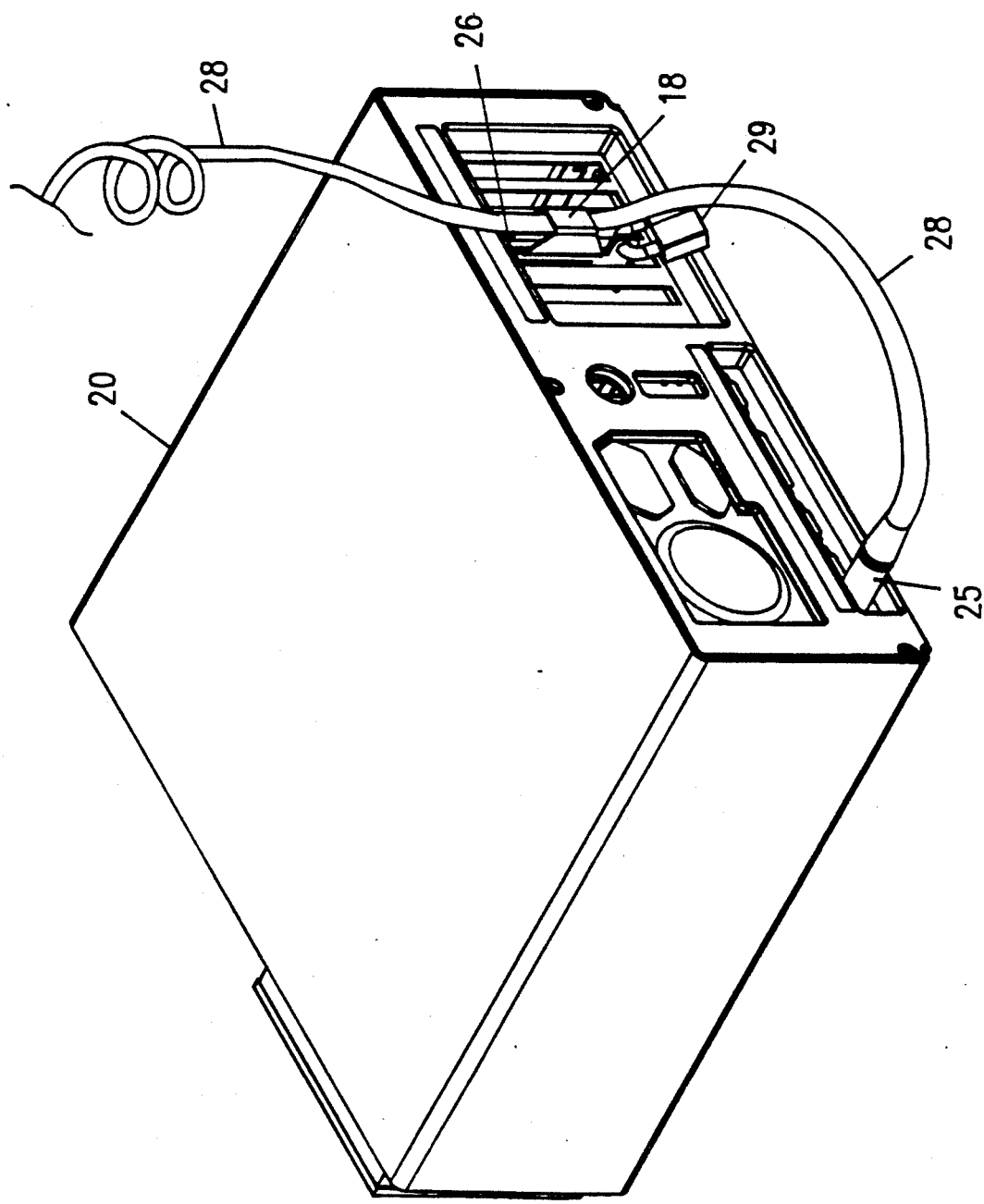
FIG. 5 illustrates the preferred embodiment of the lock assembly of this invention in place in the computer.

FIG. 5 is a perspective view of computer unit 20 with the lock hold-down assembly of this invention in place in expansion slot 26, forming the preferred embodiment. Lock 29 is shown securing flanges 14 and 16 through apertures 31 and 32, respectively. Cable 28 from keyboard 40 is shown passing through cable enclosure 18 of cover member 12, terminating in connector 25 connected in place in computer unit 20.

MODE OF OPERATION OF THE INVENTION

Turning to FIGS. 2A-2C, bracket member 11a simply has clamp 13 inserted in place into slot 17, with anchor cable 15 passing through expansion card slot 26 of FIG. 5, to be secured as desired.

FIG. 3 illustrates another embodiment whereby lock 29 is inserted into aperture 31 of integral flange 16, with an anchor cable (not shown) securing the lock in any manner well known in the art.

In the preferred embodiment of this invention, as shown in FIGS. 4 and 5, bracket 11c (or 11b) has its tabs 35 engaged by hooks 36 of cover member 12 and further has cable 28 passed through cable enclosure 18. Lock 29 locks the bracket member and the cover member together and further secures keyboard 40 by entrapping cable 28. Obviously, the cable from monitor 30 could be passed through cable enclosure 18, as well as a cable from a mouse of other peripheral equipment, or power cables.

The above described arrangement is merely an illustrative application of the principles of the invention. Numerous other arrangements may be devised by those skilled in the art without departing from the spirit and scope of the invention which is limited only as defined by the appended claims.

What is claimed is:

1. A lock hold-down assembly for a digital computer system including a system unit having at least one expansion card slot in its chassis, comprising:
    (a) a bracket member, adapted to be mounted inside the system unit adjacent the expansion card slot;
    (b) a lock;
    (c) a first flange, integral with the bracket member and projecting through the slot, having an aperture therethrough, the aperture being positioned to enable the lock to be inserted through the aperture, thereby securing the system unit to the lock;
    (d) a first fastener, integral with the bracket member and accessible through the slot;
    (e) a cover member, for mounting on the outside of the chassis, having an integral second fastener for interlocking through the slot with the first fastener;
    (f) a cable enclosure, integral with the cover member, formed and positioned to secure the cable to the cover member when the first and second fasteners are interlocked; and
    (g) a second flange, integral with the cover member and having an aperture therethrough aligned with the aperture in the first flange, to enable the lock to be inserted through both apertures, thereby securing the system unit and the cable to the lock when the first and second fasteners are interlocked.

2. The assembly of claim 1 wherein the first fastener comprises a plurality of tabs.

3. The assembly of claim 2 wherein the second fastener comprises a plurality of hooks, each hook interlocking with a corresponding one of the plurality of tabs.

4. The assembly of claim 1 wherein the cable enclosure comprises a shroud terminating on each side at the second fastener, thereby forming a channel through which the cable is passed and by which the cable is secured.

5. The assembly of claim 3 wherein the cable enclosure a shroud terminating on each side at the second fastener, thereby forming a channel through which the cable passes and by which the cable is secured.

* * * * *